Figure 1:
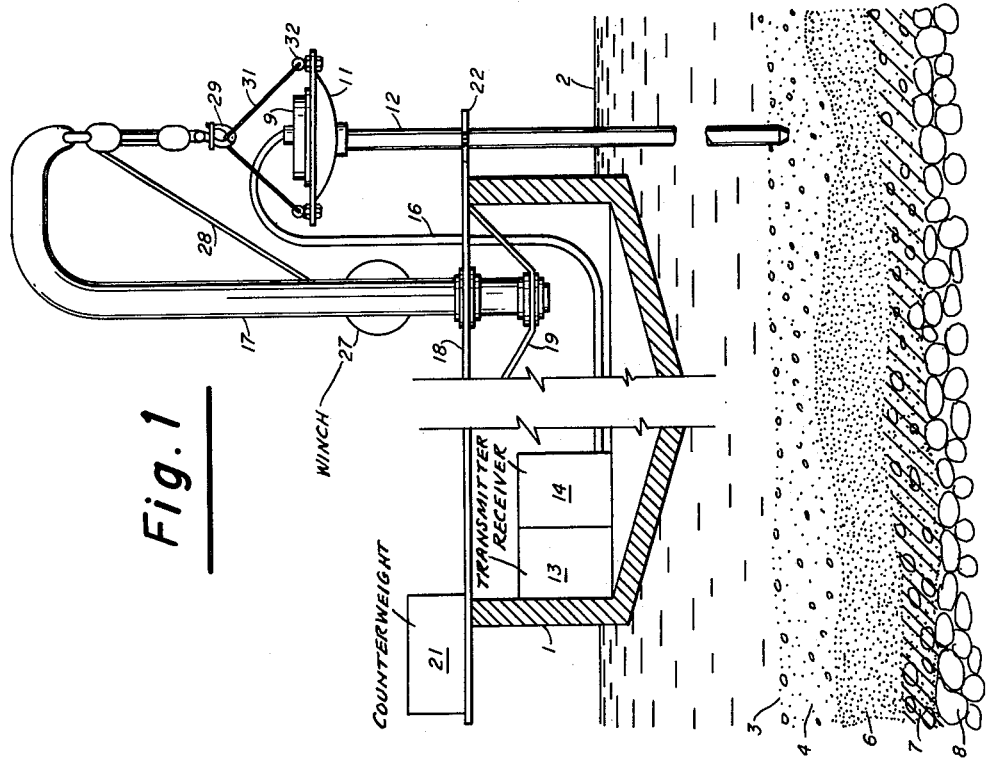

Jan. 5, 1965  P. F. MINASIAN  3,164,799
APPARATUS FOR LOCATING AND MEASURING HARD STRATA
BENEATH RIVERS AND OTHER WATER BASINS
Filed April 24, 1961

INVENTOR.
PAUL F. MINASIAN

BY

ATTORNEYS

United States Patent Office 3,164,799
Patented Jan. 5, 1965

3,164,799
APPARATUS FOR LOCATING AND MEASURING HARD STRATA BENEATH RIVERS AND OTHER WATER BASINS
Paul F. Minasian, 115 Plov Way, Vallejo, Calif.
Filed Apr. 24, 1961, Ser. No. 105,242
8 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The invention relates generally to subsurface explorations and, in particular, to acoustically-performed explorations of strata underlying water basins of various types.

Subsurface explorations frequently are conducted to determine the existence and location of valuable mineral deposits. In other circumstances, these explorations may be more in the nature of oceanographic surveys intended for the most part to measure or portray contour variations of the ocean floor or of strata underlying the floor.

One pertinent method by which such explorations have been accomplished is the use of echo sounders which in some instances, are capable of driving short pulses of acoustic energy to rather substantial depths from which reflected echoes may be received at the water surface. In such echo sounders, the pulsed energy traversing the various strata is reflected and returned from strata interfaces, the intensity and duration of these returned echoes varying in a known manner in accordance with the density and thickness of the strata. Most echo sounders, however, are incapable of penetrating the subsurface for any appreciable distance.

When depth penetrations are achieved, the apparatus required is highly specialized, expensive and rather cumbersome, one of the principal reasons being the fact that the penetration ability of the sound is largely dependent upon the use of extremely high power input in the same order as explosives used in other seismic techniques. Such high power requirements, in turn, are reflected throughout all of the equipment to the extent that many circuit components such as the power amplifier, the relays and the transducer itself, must be specially designed. Also, this equipment is of the type that must be specially built into a ship even a large truck if such is to be used. Obviously, its expense and size makes it impracticable for use in simpler tasks where, for instance, a number of units are required and the units themselves may be employed only on an intermittent basis.

One object of the present invention is to provide a method and apparatus for the subsurface exploration of water basin floors, the apparatus being relatively simple and inexpensive.

Another object is to provide apparatus of the foregoing type which can be easily installed on or removed from any conventional ship or small boat.

A more specific object is to provide a method and apparatus for locating the hard strata beneath the floor of a water basin and, relative to this object, is the further object of determining the depth of this hard strata so as to ascertain the length of piles or other similar objects which it is desired to sink into this hard strata.

These and other objects which will become readily apparent are achieved primarily by utilizing a steel shaft which is acoustically coupled to a transducer disposed above the water surface, the shaft being of sufficient length to extend downwardly to the water basin floor. When such a shaft is used, a moderate power input into the transducer is capable of projecting pulsed acoustic energy through the shaft and downwardly through the underlying strata to a depth sufficient to locate the hard layer which it may be desired to use. Preferably, a relatively low frequency of 30,000 cycles or less is employed and the acoustic power may be in the order of 70 to 80 decibels per volt per microbar operated at a 110 volts A.C. A short pulse, most suitably is employed, the pulse length being between 2 to 5 milliseconds and the pulse is repetitively generated at a pulse rate of 60 to 120 pulses per second.

Using such equipment, which, as will be recognized, can be standard equipment, the determinations of the desired hard strata can be accurately and simply derived. For example, in determining the depth of a hard strata for the purpose of sinking a pile, the metal shaft may be placed on the bottom which for the most part, will be formed of a layer of sediment and sand, beneath which may be layers of relatively loose limestone, sandy clay shale, as well as the bottom layer of rock which in this case would be considered the so-called hard strata.

Pulsed energy delivered via the shaft through these layers produces sound reflections at all strata interfaces, but the echo received from the hard strata or rock will be easily discernible by its relative intensity and duration which, as is known, is dependent to a large part upon the density of the strata. Having such data, it becomes a rather simple matter to determine the depth of the hard strata by measuring the time lapse between the projected pulse and the returned echo. Considerable accuracy is achieved since the length of the shaft is a known factor as is the speed of sound in this shaft. Also, because of the high directivity permitted by the employment of the shaft, there is a relatively high energy level in the vertical path of the sound, the same consideration also being applicable to the returned echoes. Consequently, because of this directivity and high energy levels, the task of differentiating between the return echoes is greatly facilitated.

Other important features of the invention will be considered in the detailed description which is to follow. It perhaps should be noted at this point that the term hard strata as used herein is somewhat flexible in that it connotes the hardest underlying strata. Whether this detected strata is of sufficient hardness for the intended purposes is a matter to be determined by the operator in accordance with relative returned echo intensity and duration.

The preferred embodiment of the invention is illustrated in the accompanying drawings of which—

Figure 2:
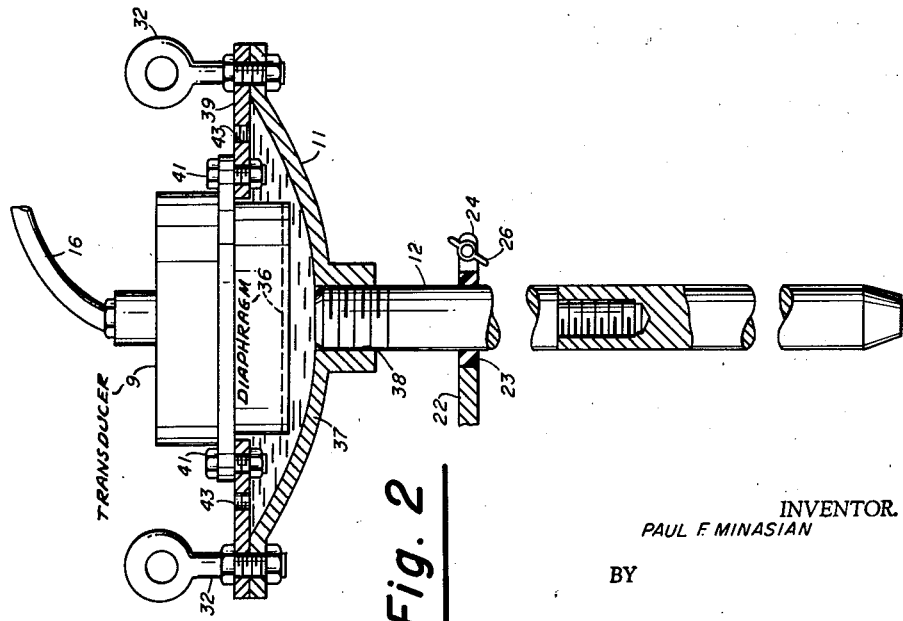

FIG. 1 is a somewhat schematic view showing a ship or craft in vertical section and the apparatus of the invention in elevation, and FIG. 2 is a longitudinal sectional view of the apparatus itself.

Referring to FIG. 1, a ship or craft having a hull 1 is waterborne in a body of water which may be any water basin such as that of a river, ocean or lake; the basin having a floor or bottom 3 formed of various strata or layers including a sediment layer 4, sand 6, shale 7 and rock 8. Such layers, of course, are intended to be simply representative of somewhat typical conditions, and it will be appreciated that the strata may include others such as limestone, sandy clay, concentrated salt water, etc.

It has been stated that one of the present objects is to determine the depth of a hard strata, such as rock 8, so that piles or other objects can be selected and sunk or anchored in this rock layer. Heretofore, it has been common practice to determine the depth of this hard strata by employing divers to physically dig to the hard strata and make appropriate measurements. Obviously, such a manual operation is tedious, expensive and somewhat hazardous. An alternate method which also is quite expensive is that of driving random test piles to determine specific pile lengths. In the present invention, this objective is accomplished in a relatively rapid, inexpensive and nonhazardous manner by employing an echo-sounding technique of the type already indicated.

Referring again to FIG. 1, the echo-sounding apparatus generally includes a transducer 9, a transducer casing 11, a solid metal shaft 12, a pulse generator and transmitter 13 and an echo receiver and indicator 14; the generator and receiver being electrically coupled to the transducer by a flexible cable 16.

To support the transducer and shaft in operative position, the ship or craft mounts a davit assembly 17, the davit being mounted on a support frame 18 and a bracket 19 and the frame being carried in the manner shown by boat hull 1. For practical purposes, a variable counterweight 21 balances the weight of the davit and its supported transducer and shaft. Support frame 18 also mounts a shaft guide and supporting clamp 22 and one significant feature is that this clamp has its shaft-engaging portions 23 lined with a sound absorbent material (FIG. 2). Like many of the other components, clamp 22 may be formed in any known and appropriate manner. The mechanism illustrated is a C-ring having flanges 24 which may be brought together and adjustably tightened into clamping engagement by a nut and bolt arrangement 26.

Some additional conventional components include a davit-mounted winch 27 capable of reeling-in or paying-out a cable 28 which terminates in a swivel and pelican hook arrangement 29, the hook engaging a bail-like cable 31 secured to transducer casing 11 by eye bolts 32.

The echo sounding apparatus itself may be standard equipment in the sense that it need not be specially constructed. In fact, the various parts will be found in rather frequent use in a number of other operations or applications. For example, pulse generator 13, which is shown in block form, is intended to include the usual oscillator and a keyer which may, for example, include a pulse generator and a gate. A free running oscillator normally would be employed with a frequency determined by a crystal preferably operating at a relatively low frequency of 30,000 cycles or less. Since transmission losses decrease as the frequency is lowered, a low frequency is preferred. It is not, however, too critical since the remaining apparatus adequately minimizes transmission losses.

The pulse provided in the usual pulse forming section of the projector may be rectangular or of any other shape desired, while the keyer is employed to control the pulse repetition rate. Most suitably, the apparatus employs a short pulse having a length of 2 to 5 milliseconds, the pulse rate being within an adjustable range of 60 to 120 pulses per second. By employing such a short pulse and pulse rate, the echoes reflected from the various interfaces in the subsurface strata are adequately separated for clear differentiation so that the more intense reflected echo from the hard strata is easily distinguishable from the relatively weaker returns from other softer strata.

Receiver 14 also may be any conventional receiver capable of accepting and amplifying return echo pulses for delivery to an indicating device which may be an oscilloscope perhaps with a camera attachment or, if desired, a speaker or a suitable recorder also may be employed. These units, i.e., the receiver and the speaker, have no special power requirements and therefore require no special circuit components. Ten kilowatts has been found to be entirely adequate, although a better definition is in terms of acoustic power which may be 70 to 80 db/v./microbar, operable at 110 volts A.C. To operate the equipment it is necessary to provide a conventional relay or switch to alternately couple the transducer to the projector and the receiver. The objective, of course, is to first transmit a pulse and then to switch the apparatus so that the returned signal echo is fed to the receiver where it is indicated.

The principal feature of the invention is the use of metal shaft 12 which, as shown in FIG. 1, extends from a point above the surface of water 2 vertically downwardly to water basin floor 3 to provide a highly directive path for the projected pulses, as well as for the return echoes. More suitably, this shaft is a solid extension of about three inches diameter and it may be made of any appropriate material although CRES (corrosion resistant steel) is preferred to withstand the corrosive action of the water. Since the sound velocity of CRES or any other material employed is a known factor, accuracy in depth measurements is increased. For example, the sound velocity characteristics of CRES is between 14,000 and 17,000 feet per second and, of course, the precise velocity can be determined for each shaft used.

It is obvious that the shaft length will be known and, as shown in FIG. 2, this length may be increased or decreased by adding additional sections, the shaft sections being bolted together in the manner shown. Winch 27 is employed to raise and lower the shaft so as to position its end portion on or in bottom 3, although, as is evident, transducer 9 and its casing remain above water. Connecting cable 16 should be flexible so as to accommodate the adjustments achieved by means of winch 27.

FIG. 2 illustrates a particular transducer arrangement, it being obvious that many types would be suitable. For example, appropriate transducer types and their frequencies include Navy type AT200A (frequency 12 kc. ammonium di-hydrogen phosphate crystal array), Navy type 78248 frequency 20 kc., ADP crystal array, and Navy type 78221 frequency 30 kc., magneto-striction.

The particular transducer shown in FIG. 2 may have any of the drivers indicated above, the acoustic output being applied to the shaft by a rubber diaphragm member illustrated and identified as diaphragm 36. To ensure maximum coupling of the acoustic output, transducer 9 is mounted in transducer casing 11 which has a cup-shaped member 37 centrally provided in its bottom with a flanged and threaded opening 38, the casing being completed by the use of a ring-shaped cover member 39 bolted to member 37 by bolts 32. As shown, cover 39 has a central opening into which transducer 9 is closely fitted. Connecting bolts 41 project through the inner peripheral edge of cover 39, and these bolts as well as bolts 32 should be drawn sufficiently tight to permit a pressure reduction within the casing of about 28 inches (mercury).

To acoustically couple the output diaphragm 36, the interior of casing 37 is filled with a suitable fluid, such as castor oil, and the cup member should be sufficiently deep to provide at least one-fourth of an inch of castor oil between radiating diaphragm 36 and the bottom of the casing. Access openings 43 are provided in cover 39 to permit the filling of the casing with the castor oil and also to permit the evacuation necessary for the interior pressure reduction.

Flanged and threaded opening 38 provided in the bottom of casing member 37 is for the obvious purpose receiving the upper end of shaft 12, the shaft being threaded into this opening so as to be in direct contact with the castor oil which then provides a sound energy coupling medium between radiating diaphragm 36 and the top portion of the shaft itself.

The operation of the apparatus should be rather self-evident. Assuming the intended use of the apparatus to be one of locating hard strata 8 to permit a proper choice of pile length, the transducer apparatus first is mounted on a craft 1 which obviously need not be specially formed for the purpose. The craft proceeds along the area into which piles are to be sunk and measurements are taken at spaced intervals by lowering shaft 12 to position, its bottom end in contact with the basin floor or bottom 3. If needed, additional lengths of shafts may be coupled to lengthen the shaft a proper amount. With the shaft so positioned the projector and receiver may be operated in a manner well-known in the echo sounding art. A pulse of predetermined length and frequency is delivered to the transducer where it is converted into acoustic energy and projected into bottom 3 via metal shaft 12. One of the important factors is that shaft 12 provides unusual directivity so as to project the energy vertically downwardly to substantial depths which will depend to some extent upon the frequency and power employed. However, the apparatus does not require such excessive power such as would entail special electronics.

Echoes of reflected acoustic energy pulses will be returned to the shaft from floor layers 4, 6, 7 and these return echoes may be recorded or displayed to provide time lapse data from which the determination of the hard strata depth easily can be derived. Error in the determination is kept to a minimum since the velocity of sound in the steel shaft is a known characteristic. Another important consideration is that the steel shaft is a highly efficient means of minimizing transmission losses so that greater depths may be reached for any given power input. Also, the return echoes are more easily differentiated.

As will be appreciated the present invention is far more appropriate than other highly complicated seismic or echo-sounding methods for determining pile lengths and for other similar jobs. It also is equally apparent that the present echo sounding technique is far to be preferred over the conventional use of divers or test-pile procedures.

Obviously many modifications and variations of the present invention are possible in the light of the above teachings. It is therefore to be understood that within the scope of the appended claims the invention may be practiced otherwise than as specifically described.

What is claimed is:

1. Shipborne surveying apparatus for determining distances between a water basin floor and its underlying hard strata, comprising electro-acoustic transducer means, an elongated metal shaft acoustically coupled to and dependingly supported by said transducer means, support means carried by said ship for suspending said transducer above said water with its dependent shaft extending downwardly through the water into substantial contact with said basin floor, means carried by the ship for repetitively generating and receiving electric pulses, and means connecting said generating and receiving means to said transducer means whereby pulsed energy may be projected via said shaft to said hard strata and reflected energy from said strata received in said ship, said distance measurements being derivable from the lapse of time between said pulse projections and the receipt of said pulse reflections.

2. The apparatus of claim 1 wherein said support means includes means for raising and lowering said transducer and its dependent shaft, and means for clamping said shaft in a fixed position.

3. The apparatus of claim 2 wherein said clamp has its shaft-engaging portions formed of sound absorbent material.

4. The apparatus of claim 1 wherein said transducer means includes a casing provided with access means for reducing its interior pressure, an energy-coupling fluid carried by the casing, and a diaphragm-type transducer immersed in said fluid, said metal shaft having an end portion carried by said casing, and said end portion being exposed to said energy coupling fluid.

5. The apparatus of claim 1 wherein the pulsed energy delivered to said shaft has a pulse length of 2 to 5 milliseconds and a repetition rate of 60 to 120 pulses per second.

6. The apparatus of claim 4 wherein the pulsed energy delivered to the shaft has a pulse length of 2 to 5 milliseconds and a repetition rate of 60 to 120 pulses per second.

7. Apparatus for determining distances between a water basin floor and its underlying hard strata, comprising electro-acoustic transducer means, an elongated metal shaft acoustically coupled to and dependingly supported by said transducer means, means supported at the surface of said basin for suspending said transducer with its dependent shaft extending downwardly through the water into substantial contact with said basin floor, means for repetitively generating and receiving electric pulses, and means connecting said generating and receiving means to said transducer means whereby pulsed energy may be projected via said shaft to said hard strata and reflected energy from said strata may be received, said distance measurements being derivable from the lapse of time between said pulse projections and the receipt of said pulse reflections.

8. The apparatus of claim 7 wherein the pulsed energy delivered to the shaft has a pulse length of 2 to 5 milliseconds and a repetition rate of 60 to 120 pulses per second.

References Cited by the Examiner

UNITED STATES PATENTS

| | | | |
|---|---|---|---|
| 2,149,427 | 3/19 | Faust | 181—.5 |
| 2,241,428 | 5/41 | Silverman | 181—.5 |
| 2,415,832 | 2/47 | Mason | 181—.5 |
| 2,560,911 | 7/51 | Wolf | 340—18 |
| 2,590,530 | 3/52 | Groenendyke | 181—.5 |
| 2,709,918 | 6/55 | Yetter | 73—290 |
| 2,749,531 | 6/56 | Rines | 340—6 |
| 2,766,313 | 10/56 | Reschke | 340—1 |
| 3,022,852 | 2/62 | Pavey | 181—.5 |

CHESTER L. JUSTUS, *Primary Examiner.*